Figure 7:
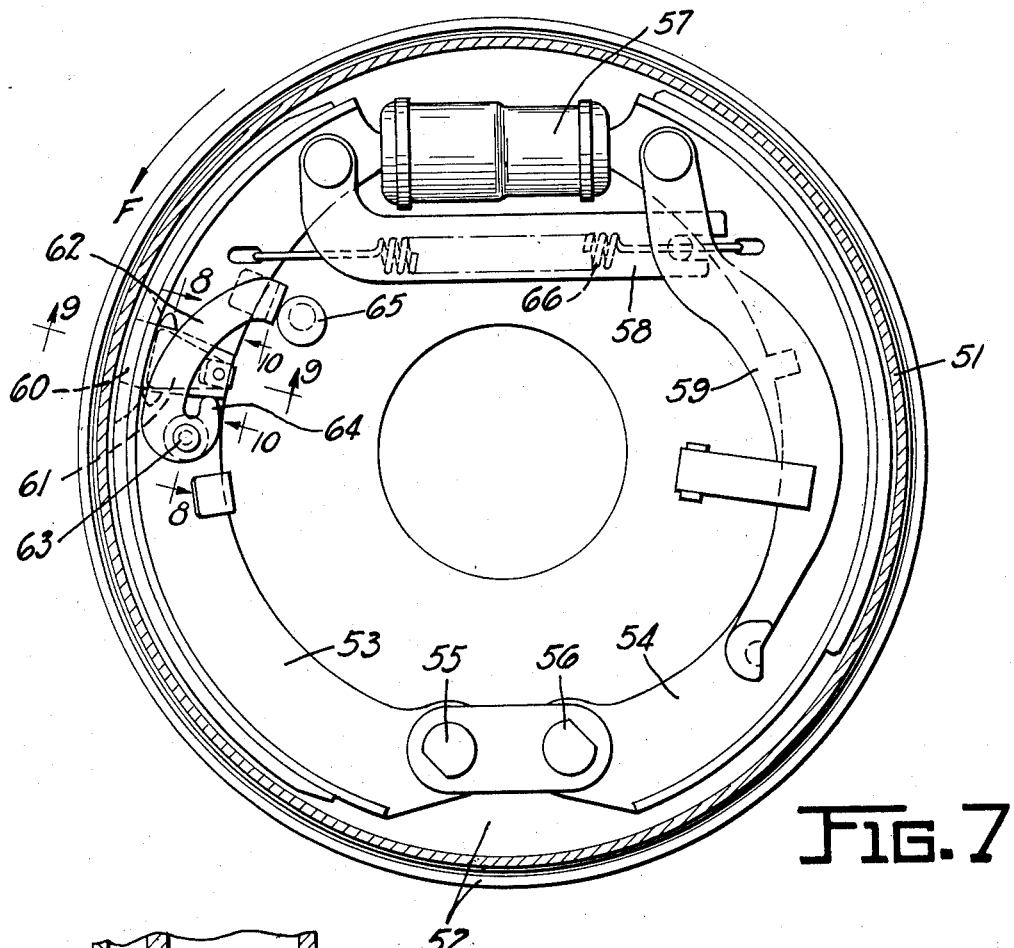

Nov. 27, 1945.　　　R. A. GOEPFRICH　　　2,389,618
BRAKE
Filed Aug. 1, 1942　　　3 Sheets-Sheet 1
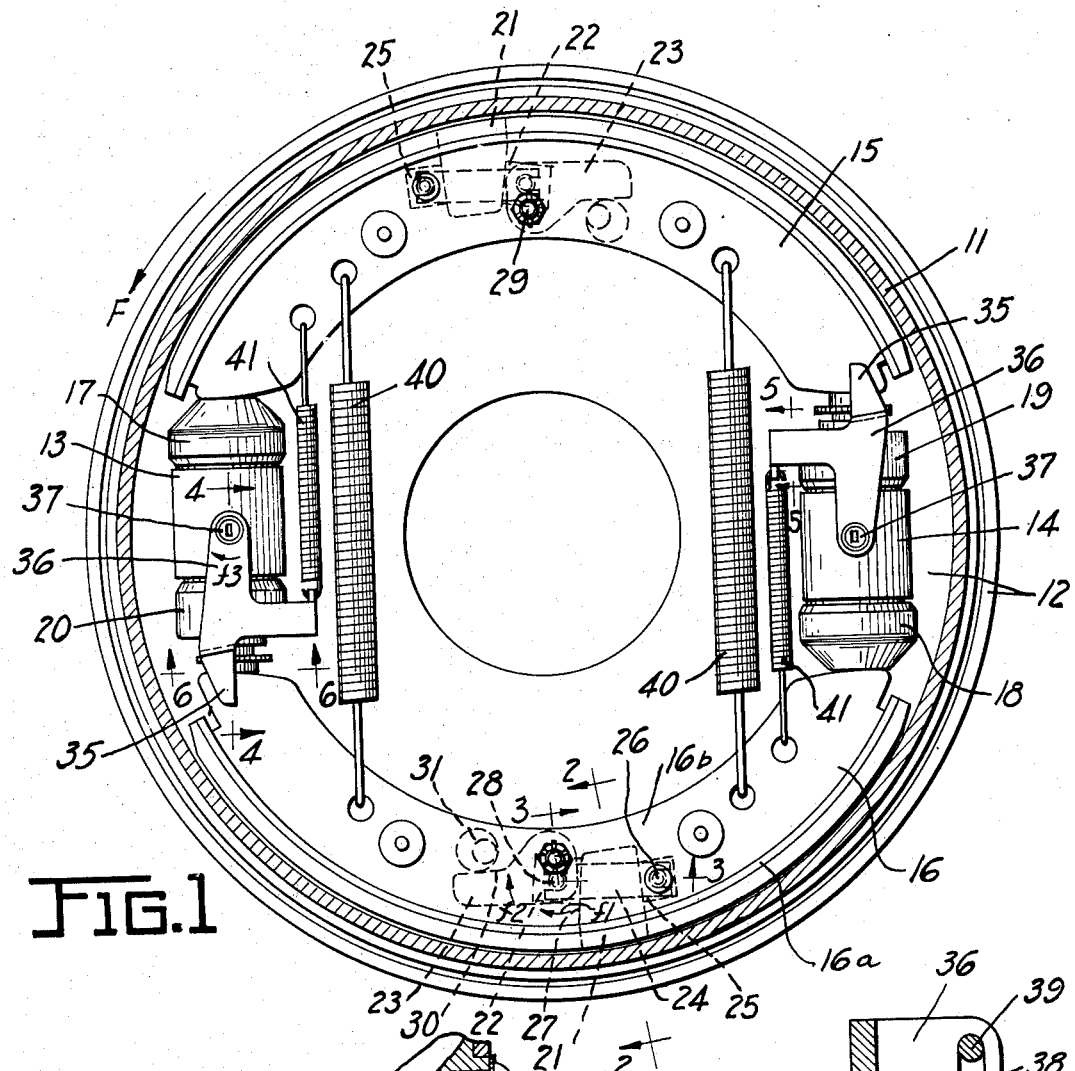
INVENTOR
RUDOLPH A. GOEPFRICH
BY
M. W. McConkey
ATTORNEY Nov. 27, 1945. R. A. GOEPFRICH 2,389,618
BRAKE
Filed Aug. 1, 1942 3 Sheets-Sheet 2
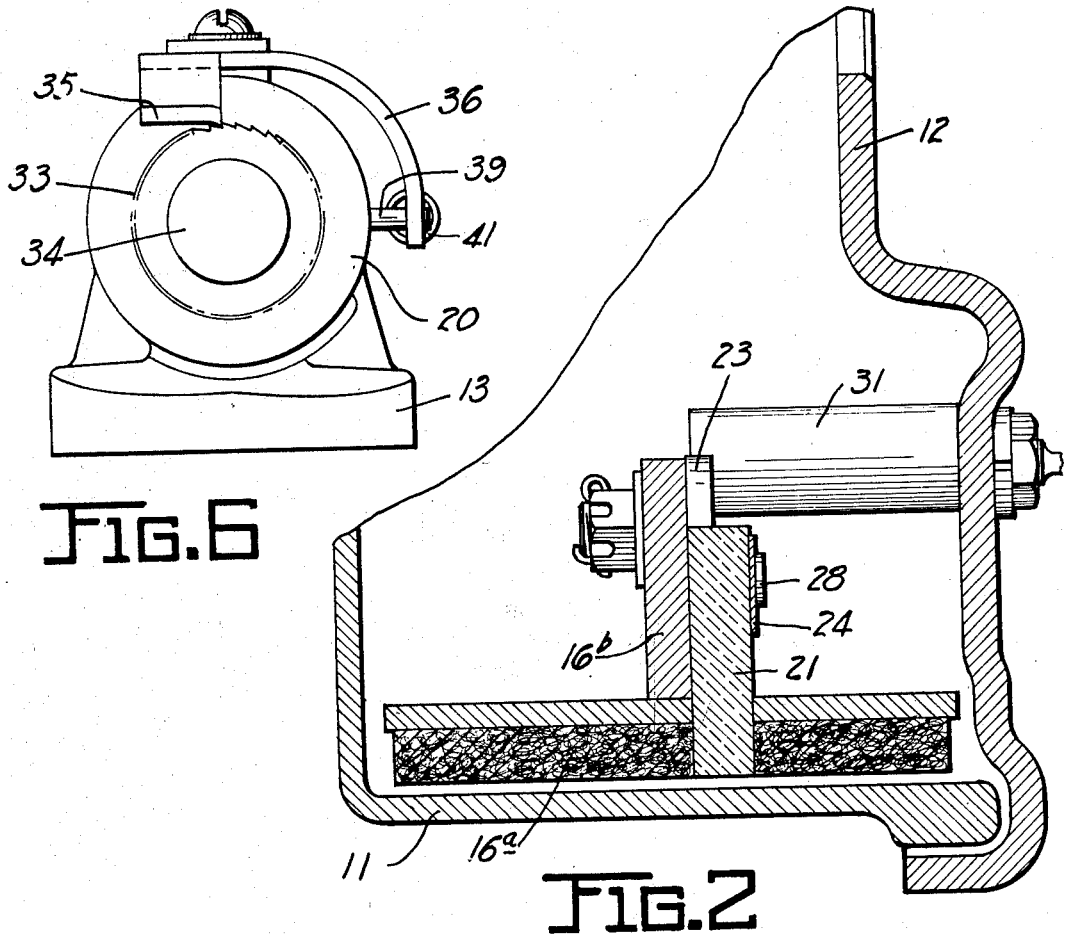
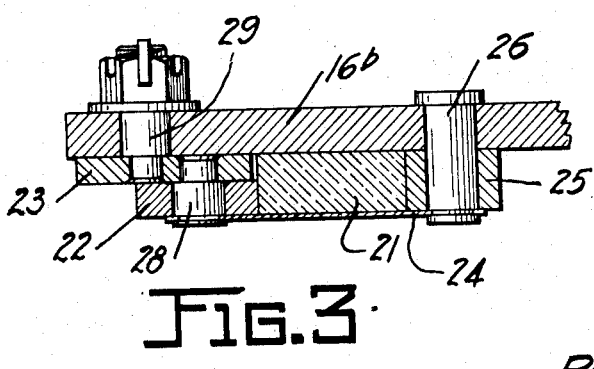
INVENTOR.
RUDOLPH A. GOEPFRICH
BY
M. W. McConkey
ATTORNEY.

Nov. 27, 1945.    R. A. GOEPFRICH    2,389,618
BRAKE
Filed Aug. 1, 1942    3 Sheets-Sheet 3

INVENTOR.
RUDOLPH A. GOEPFRICH
BY
M. W. McConkey
ATTORNEY

Patented Nov. 27, 1945

2,389,618

UNITED STATES PATENT OFFICE 2,389,618

BRAKE

Rudolph A. Goepfrich, South Bend, Ind., assignor to Bendix Aviation Corporation, South Bend, Ind., a corporation of Delaware Application August 1, 1942, Serial No. 453,237

3 Claims. (Cl. 188—79.5)

This invention relates to brakes of the internal shoe drum type and particularly to automatic adjusting mechanism for such brakes.

It is the chief object of my invention to provide, for use with a brake having a plurality of shoes which are individually shiftable to anchor at either end, the combination of means for automatically adjusting the position of the shoes relative to the drum whenever shoe lining wear requires adjustment with means for taking up the slack created by such adjustment between one end of the shoe and its anchor. To this end I utilize a pair of shoes, a pair of hydraulic cylinders which serve as applying and anchoring means for the shoes, a drum contact type automatic adjustment with each shoe, and automatic means for turning an adjusting screw which is inserted in one end of each hydraulic cylinder to move outwardly and follow up the shoe after the shoe is automatically adjusted.

A supplementary object is to provide a drum actuated automatic adjustment having a drum actuated friction block so designed that lining dust cannot clog operation of the block. In earlier automatic adjustments of this type an angular opening or recess was made in the friction block which had a cam follower moving therein and which changed the position of the cam follower as the friction block was pushed inwardly with respect to the brake shoe. Some trouble has been encountered with the latter arrangement, and the design of the automatic adjustment shown in this application has therefore been improved to avoid the trouble referred to. A further object of the invention is to simplify the design of an automatically adjustable brake and to simplify the manufacturing operations used in making the brake.

Other objects and advantages of the invention will be apparent during the following description.

Figure 8:
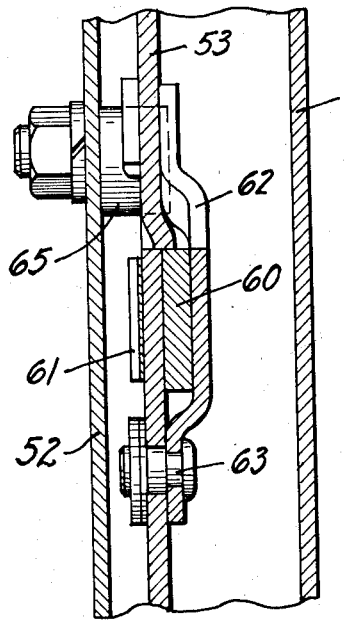
Figures 9, 10:
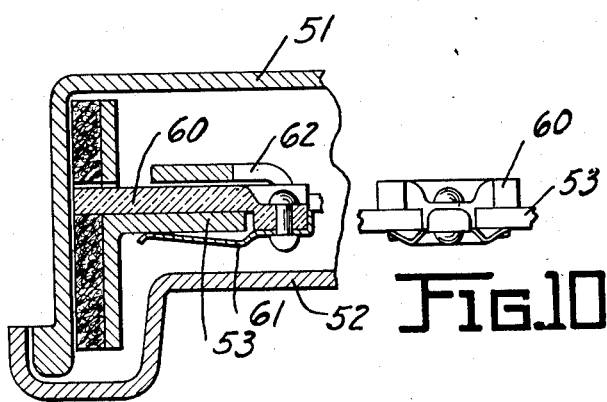

In the drawings:

Figure 1 is a vertical section taken through a brake assembly on a plane just inside the head of a brake drum and showing the shoes in side elevation;

Figures 2, 3, 4 and 5 are sections taken on the lines 2—2, 3—3, 4—4, and 5—5 respectively of Figure 1;

Figure 6 is an end view taken in the direction of the arrows 6—6 of one of the hydraulic applying cylinders of Figure 1, the cylinder also serving as an anchor for the brake shoes;

Figure 7 is a section taken through a brake assembly showing a brake which is a modification of the brake of Figure 1 and a drum actuated automatic adjustment which is a modification of the automatic adjustment of Figure 1; and Figures 8, 9 and 10 are sections taken on the lines 8—8, 9—9, and 10—10 respectively of Figure 7.

The brake of Figures 1 to 6 inclusive comprises generally a rotatable brake drum 11, a non-rotatable support or backing plate 12, a pair of hydraulic wheel cylinders 13 and 14 mounted on the backing plate, and a pair of brake shoes 15 and 16 which are arranged to be applied against the drum by the wheel cylinders 13 and 14 and each of which may anchor at either end against one of the wheel cylinders depending on the direction of drum rotation. Thus if the direction of rotation of the brake drum is forward as indicated by the arrow F in Figure 1, shoe 15 will anchor through cap 17 on wheel cylinder 13 and shoe 16 will anchor through cap 18 on wheel cylinder 14. If the drum is rotating in the rearward or opposite direction, shoe 15 will anchor through cap 19 on wheel cylinder 14 and shoe 16 will anchor through cap 20 on wheel cylinder 13.

The arrangement of the brake is symmetrical in the sense that operation of the shoes and their applying and anchoring means is identical and description of the operation of one-half of the brake including one shoe serves as description of the operation of the other half. Each of the shoes 15 and 16 is provided with automatic adjusting mechanism which comprises a drum contact block 21, a cam follower block 22, and a lever 23. Drum contact block 21 extends through an opening in, and has its outer surface flush with, the surface of shoe lining 16a. One side of the drum contact block 21 bears against a block 25 pivotally mounted on the shoe web 16b by a pin 26 (see Figure 3). The other side of drum contact block 21 which is inclined to form an angular surface 27 bears against the cam follower block 22. The drum contact block is also frictionally clamped to the shoe web by a spring 24. Block 22 is pivoted by a pin 28 to the lever 23. Lever 23 in turn is pivoted by pin 29 to the shoe web and has an extending surface 30 which is adapted when the shoe is in released position to contact a stop 31 mounted on the backing plate. The stop 31 is eccentrically mounted on backing plate 12 and may be initially adjusted by manual means to the proper position; i. e. so that it will in its fixed position and when the shoe is new just contact the edge 30 of lever 23 when the shoe is in released position.

Between one end of each shoe and the adjacent wheel cylinder there is provided an expansible mechanism which serves to, in effect, spread the anchor in accordance with adjustment of the shoe made by the automatic adjustment mechanism described above. This expansible mechanism in each case includes (see Figure 4) a threaded adjusting screw 32 screwed into an opening in cap 19 or 20. The outer periphery 33 of the screw head is ratcheted to form a series of teeth. An anchor plug 34 extends into a recess in the adjusting screw 32 and has its head bearing on one side against the head of the adjusting screw and on the other side against the web of the associated shoe. A pawl 35 to contact the teeth of the ratchet 33 is formed at one end of a bell crank lever 36 which is pivoted at 37 on the fixed casing of the wheel cylinder and which has an arm bent around the outside of the wheel cylinder with an elongated slot 38 (see Figure 5) near the end of the arm. A pin 39 is fixed to the cap 19 or 20 and extends into slot 38 of the bell crank lever. The various parts of the brake are biased to released position and are maintained in proper relationship to one another by three pairs of springs. The springs 40 of one pair are relatively heavy and serve as return springs which normally bias the shoes toward released position. The springs 41 are each connected at one end to one of the shoes and at the other end to lever 36, hooking to the lever through slot 38. The springs 42 are compressed between the anchor plugs 34 and the bottom of the recesses in the adjusting screws 32.

Operation of my improved device will now be described. When the brakes are applied while the vehicle moves forward, in which case the drum rotates in the direction designated by the arrow F, shoe 16 is forced into the drum by piston 13a in cylinder 13 and anchors on cylinder 14. Operation of the two shoes and their adjustments is identical and description of one is therefore intended to suffice for both. It will be noted that when this occurs, the lever 23 which is pivotally mounted on the brake shoe by means of pin 29, moves with the shoe and consequently leaves the stop pin 31 which is adjustably mounted in the backing plate. The adjustable feature in this stop pin is for initial adjustment only, to compensate for manufacturing tolerances. During a brake application, the drum contact block 21, which has its edge flush with the lining face, and which is located between block 25, pivotally mounted on the shoe by pin 26 and block 22 pivotally mounted on the pin 28, also moves with the shoe.

If, during a brake application, some lining is worn off, the drum contact block will, because of its comparatively light resistance to movement and because of its high wear factor, be pushed back on the shoe, that is, toward the center of the brake. When this occurs, the angular face 27 on the drum contact block forces block 22 in the direction of arrow $f^1$. This in turn causes lever 23 to pivot about pin 29 in the direction of arrow $f^2$. Thus, as lining wears off, lever 23 takes a new position on the shoe, the movement being proportional to the lining worn off.

When the brakes are released, the shoe return springs 40 and the springs 41, act on the shoe to hold it against the anchor cap 18 and the stop 31. To assure that the shoe does not locate on anchor 20 and stop 31 instead of anchor 18 and stop 31, spring 41 is provided to lessen the effect of the left side of spring 40 on shoe 16 and spring 42 is provided to increase the effect of the right side of spring 40 on shoe 16.

It will also be noted that when the brake was applied, the bell-crank lever 36 which is pivotally mounted on the cylinder was caused by outward movement of the cap 20, by means of the pin 39 acting in slot 38 to rotate about pivot 37 in a direction designated by arrow $f^3$. If now, the movement of cap 20 during a brake application was sufficient to cause the pawl 35 of bell-crank lever 36 to pick up a new tooth on the ratchet wheel of adjusting screw 33, and if the lever 23 has, due to lining wear, assumed a new position of such magnitude as to tend to create a gap between the end of shoe 16 and anchor plug 34, then spring 41 acts on the bell-crank lever to rotate it in a sense opposite to that shown by arrow $f^3$, and thereby causes adjusting screw to be threaded out of the cap by the amount equivalent to one tooth on the ratchet wheel.

In the event that there is not sufficient lining worn off for the bell-crank lever 36 to pick up a tooth on the ratchet wheel 33 and yet there is enough movement of the cap 20, due to, say, drum expansion, for said bell-crank lever to pick up a tooth on the ratchet wheel, then no adjustment will be made because the strength of spring 41 is insufficient to overcome the thread friction created by spring 40. However, as the lining wears, and the lever 23 repositions the shoe to tend to create a gap between the shoe and anchor plug, the adjustment will be made because the spring 41 is sufficiently strong to overcome the thread friction created by spring 42. Thus, at no time is there any danger of adjusting due to drum expansion resulting from heat generated by braking.

This adjustment operates in reverse braking as well as forward braking, the only requirement being that enough lining is worn off so that the bell-crank lever can pick up a tooth on the ratchet wheel. Both shoes are, of course, adjusted individually and independently and in proportion to the amount of lining worn off.

The brake shown in Figures 7 to 10 inclusive comprises a rotatable drum 51, a backing plate or support 52, a pair of brake shoes 53 and 54, pivoted respectively at 55 and 56 and applied by a hydraulic cylinder 57 between the shoes at their unpivoted ends. Auxiliary mechanical mechanism comprising a thrust link 58 and a lever 59 may also be incorporated in the brake.

Automatic adjustment means is provided for shoe 53 which is the anchoring shoe when the drum is rotating in a forward direction as shown by arrow F in Figure 7 and which therefore receives most of the wear. The adjustment comprises a drum contact block 60 lying against the web of the shoe and extending through the rim and lining of the shoe. The drum contact block is clamped to the shoe web by a flat metal spring 61. A lever 62 is pivoted at 63 on shoe 53 and has a surface 64 contacting an inclined side of the drum contact block 60. The other end of the lever is adapted to contact a fixed stop 65. Inward movement of drum contact block 60 relative to the shoe caused by wear of the shoe lining exerts a force against surface 64 of lever 62 to swing the opposite end of the lever in the direction of stop 65, the swing of the lever being proportional to the amount of wear of the shoe lining. If the shoe is drawn by return spring 66 to released position, lever 62 by its contact with stop 65 maintains the shoe in such a position that the outer surface of the shoe lining has substantially constant clearance from the drum. In this modification of the automatic adjustment and in the modification shown in Figures 1 to 6 the drum contact block has no recess which can be clogged with lining dust. The drum contact block is adequately supported to maintain its position against the shoe web and the surface of the drum contact block which is angular or cam shaped to control the adjusting lever is an exterior surface of the block.

While specific embodiments of my invention have been described in this application it is not my intention to limit the scope of my invention in any manner except by the terms of the appended claims.

I claim:

1. In a brake having a drum, a backing plate, and a lined shoe adapted to be moved at times against the drum, automatic adjusting means for the shoe comprising a block member extending through the shoe and shoe lining and having its face flush with the face of the lining so as to contact the drum when the shoe is moved against the drum, said block member being shifted inwardly relative to the shoe by wear of the shoe lining, a bearing member mounted on the shoe and contacting one side of said block member, a cam follower block having surface contact with the other side of said block member and adapted to be shifted laterally as said block member moves inwardly, a lever pivoted to the cam follower block and to the shoe, and a stop mounted on the backing plate and arranged to contact one end of the lever to hold the shoe in a released position determined by the angular position of the lever.

2. In a brake having a drum, a backing plate, and a lined shoe adapted to be moved at times against the drum, automatic adjusting means for the shoe comprising a block member extending through the shoe and shoe lining and having its face flush with the face of the lining so as to contact the drum when the shoe is moved against the drum, said block member being shifted inwardly relative to the shoe by wear of the shoe lining, a bearing member mounted on the shoe and contacting one side of said block member, a cam follower block having surface contact with the other side of said block member and adapted to be shifted laterally as said block member moves inwardly, a flat retaining member fixed to the cam follower block and bearing member and extending over the flat surface of said block member to prevent displacement of said block member, a lever pivoted to the cam follower block and to the shoe, and a stop mounted on the backing plate and arranged to contact one end of the lever to hold the shoe in a released position determined by the angular position of the lever.

3. A brake comprising a rotatable drum, a friction element movable into contact with the drum, an anchor at one end of the friction element, an automatic adjusting means for maintaining constant clearance between the friction element and the drum, said automatic adjusting means including a fixed stop, resilient means biasing the friction element to a released position determined by the anchor and the stop, applying means at the end of the friction element opposite the anchor for moving the friction element against the drum, an expansible link between the applying means and the end of the shoe including an adjusting screw having a ratcheted outer periphery, and means responsive to the extent of applying movement of the applying means for expanding the expansible link, the last named means including a lever having a pawl engaging the ratcheted outer periphery of the adjusting screw and means for causing said lever and pawl to move in a direction tending to pick up a new tooth on the ratcheted adjusting screw whenever the applying means moves outwardly to actuate the friction element.

RUDOLPH A. GOEPFRICH.